US010998641B2

(12) United States Patent
Bruhn et al.

(10) Patent No.: US 10,998,641 B2
(45) Date of Patent: May 4, 2021

(54) SYSTEMS, APPARATUS, AND METHODS FOR SELECTING ANTENNAS

(71) Applicant: DISH Technologies L.L.C., Englewood, CO (US)

(72) Inventors: Christopher William Bruhn, Aurora, CO (US); Paul Langer, Englewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 16/883,848

(22) Filed: May 26, 2020

(65) Prior Publication Data

US 2020/0287299 A1 Sep. 10, 2020

Related U.S. Application Data

(62) Division of application No. 14/986,145, filed on Dec. 31, 2015, now Pat. No. 10,700,442.

(51) Int. Cl.
*H01Q 1/22* (2006.01)
*H01Q 21/24* (2006.01)
(Continued)

(52) U.S. Cl.
CPC .......... *H01Q 21/245* (2013.01); *H01Q 1/007* (2013.01); *H01Q 1/2291* (2013.01); *H01Q 3/02* (2013.01);
(Continued)

(58) Field of Classification Search
CPC .. H01Q 1/007; H01Q 1/22–1/24; H01Q 3/24; H01Q 3/02–3/04; H01Q 21/24
See application file for complete search history.

(56) References Cited

U.S. PATENT DOCUMENTS 6,278,405 B1 *  8/2001  Ha ............................. G01S 3/38
                                                                    342/359
6,816,121 B1 * 11/2004  Cheng ...................... H01Q 1/084
                                                                    343/702
(Continued)

FOREIGN PATENT DOCUMENTS

WO        2015/061396 A1    4/2015

OTHER PUBLICATIONS

International Search Report, dated Apr. 7, 2017, for International Application No. PCT/US2016/068882, 3 pages.

*Primary Examiner* — Hasan Z Islam
(74) *Attorney, Agent, or Firm* — Seed Intellectual Property Law Group LLP

(57) ABSTRACT

A set-top box includes a housing including an interior having a base and a top and a first sidewall extending from a perimeter of the base to the top; an antenna coupled to the housing; one or more electric motors coupled the antenna; one or more orientation sensors coupled to the housing; a controller coupled to the housing and electrically coupled to the antenna, the one or more electric motors, and the one or more orientation sensors, the controller configured to receive information from the one or more orientation sensors, determine an orientation of the housing based on the information from the one or more orientation sensors, and actuate the one or more electric motors to change an orientation of the antenna based on the orientation of the housing; and a transmitter within the housing selectively connectable to the antenna.

17 Claims, 5 Drawing Sheets

(51) Int. Cl.
*H04N 5/64* (2006.01)
*H01Q 3/04* (2006.01)
*H01Q 1/00* (2006.01)
*H01Q 3/02* (2006.01)
*H01Q 3/24* (2006.01)

(52) U.S. Cl.
CPC ............... *H01Q 3/04* (2013.01); *H01Q 3/24* (2013.01); *H04N 5/64* (2013.01)

(56) References Cited

U.S. PATENT DOCUMENTS

| | | |
|---|---|---|
| 7,265,728 B1 * | 9/2007 | Tsao .................. H01Q 1/125 342/359 |
| 9,660,323 B2 | 5/2017 | Au |
| 10,263,451 B2 | 4/2019 | Konanur et al. |
| 2009/0295648 A1 | 12/2009 | Dorsey et al. |
| 2010/0201591 A1 | 8/2010 | Girard et al. |
| 2011/0234464 A1 | 9/2011 | Hall |
| 2014/0273882 A1 | 9/2014 | Asrani et al. |

* cited by examiner

SYSTEMS, APPARATUS, AND METHODS FOR SELECTING ANTENNAS

BACKGROUND

Technical Field

The present disclosure generally relates to selecting antennas for transmitting data and, more particularly, to selecting antennas based on the orientation of a housing to which the antennas are attached.

Description of the Related Art

In-home distribution of video through satellite and cable provider equipment, such as set-top boxes, relies on a fast and robust in-home network. Such robustness is commonly provided using hard-wired connections, such as Ethernet over twisted pair or multimedia over coax (MoCA). Some houses, offices, and other buildings do not support or have the infrastructure to support such hardwired connections.

Where wired connections are not practical, a wireless networking system, such as Wi-Fi, may be used to distribute video within a house or other building. Antennas in wireless systems, in particular di-pole antennas, radiate signals in a particular direction. Dipole antennas, for example, generally radiate their strongest signals in a direction that is perpendicular to the length of the di-pole antenna. A dipole antenna oriented in a vertical direction, the strongest signals are radiated outward in a generally horizontal direction, little to no signal being radiated upwards or downwards. Wireless networking systems rely, in part, on properly positioned and oriented antennas to send and receive data between devices, for example, between two set-top boxes or between a set-top box and a tablet or other handheld device.

Set-top boxes use a fixed antenna within or external to the set-top box and rely on proper orientation of the set-top box to orient the antenna. For example, some set-top boxes are designed to be placed flat on a shelf, in a horizontal orientation. In such set-top boxes, the antenna for the set-top box may be oriented in a vertical orientation when the box is in a horizontal position on a shelf, but if the box is oriented in a vertical position, then the antenna may be oriented in a horizontal orientation and may radiate signals predominantly in vertical directions, which may reduce or even cut off communication between the set-top box and the rest of the wireless networking system.

BRIEF SUMMARY

According to principles of the embodiments as disclosed herein, a set-top box includes a housing including an interior having a base and a top and a first sidewall extending from a perimeter of the base to the top; an antenna coupled to the housing; one or more electric motors coupled the antenna; one or more orientation sensors coupled to the housing; a controller coupled to the housing and electrically coupled to the antenna, the one or more electric motors, and the one or more orientation sensors, the controller configured to receive information from the one or more orientation sensors, determine an orientation of the housing based on the information from the one or more orientation sensors, and actuate the one or more electric motors to change an orientation of the antenna based on the orientation of the housing; and a transmitter within the housing selectively connectable to the antenna A device that determines its own orientation and selects an appropriately oriented antenna based on the device's orientation also is provided. The device may include a housing including an interior having a base and a top and a first sidewall extending from a perimeter of the base to the top. A plurality of antenna may be coupled to the housing one or more orientation sensors may also be coupled to the housing. A controller may be electrically coupled to each of the plurality of antenna and the one or more orientation sensors, and may be configured to receive information from the one or more orientation sensors, determine an orientation of the housing, and select one of the plurality of antenna to transmit and receive data. A transceiver may be located within the housing and at least one of the plurality of antenna may be being electrically coupled to the antenna.

A method for determining a device's own orientation and selecting an appropriately oriented antenna is also provided. The method may include receiving an indication of orientation of a housing from an orientation sensor, the housing have a plurality of antenna contained therein. The method may also include determining an orientation of the housing based on the indication of orientation, selecting a first antenna from the plurality of antenna within the enclosure based on the orientation of the housing, and electrically connecting the first antenna to a transceiver. The method may also include transmitting data on the first antenna.

By including multiple antennas oriented in different orientations and sensors to determine the orientation of the set-top box, the set-top box can select appropriately oriented antennas and increase the robustness of wireless communication between the set-top box and other devices connected to the wireless networking system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements are not necessarily drawn to scale, and some of these elements may be enlarged and positioned to improve drawing legibility and understanding of the features.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with set-top boxes or antenna have not been shown or described in detail to avoid unnecessarily obscuring descriptions of the embodiments.

Unless the context requires otherwise, throughout the specification and claims that follow, the word "comprise" and variations thereof, such as "comprises" and "comprising," are to be construed in an open, inclusive sense, that is, as "including, but not limited to."

References throughout this specification to "one embodiment," "an embodiment," or "some embodiments" means that a particular feature, structure or characteristic described in connection with the embodiment is included in at least one embodiment. Thus, the appearances of the phrases "in one embodiment," "in an embodiment," or "some embodiments" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not limit the scope or meaning of the embodiments.

Figure 1:
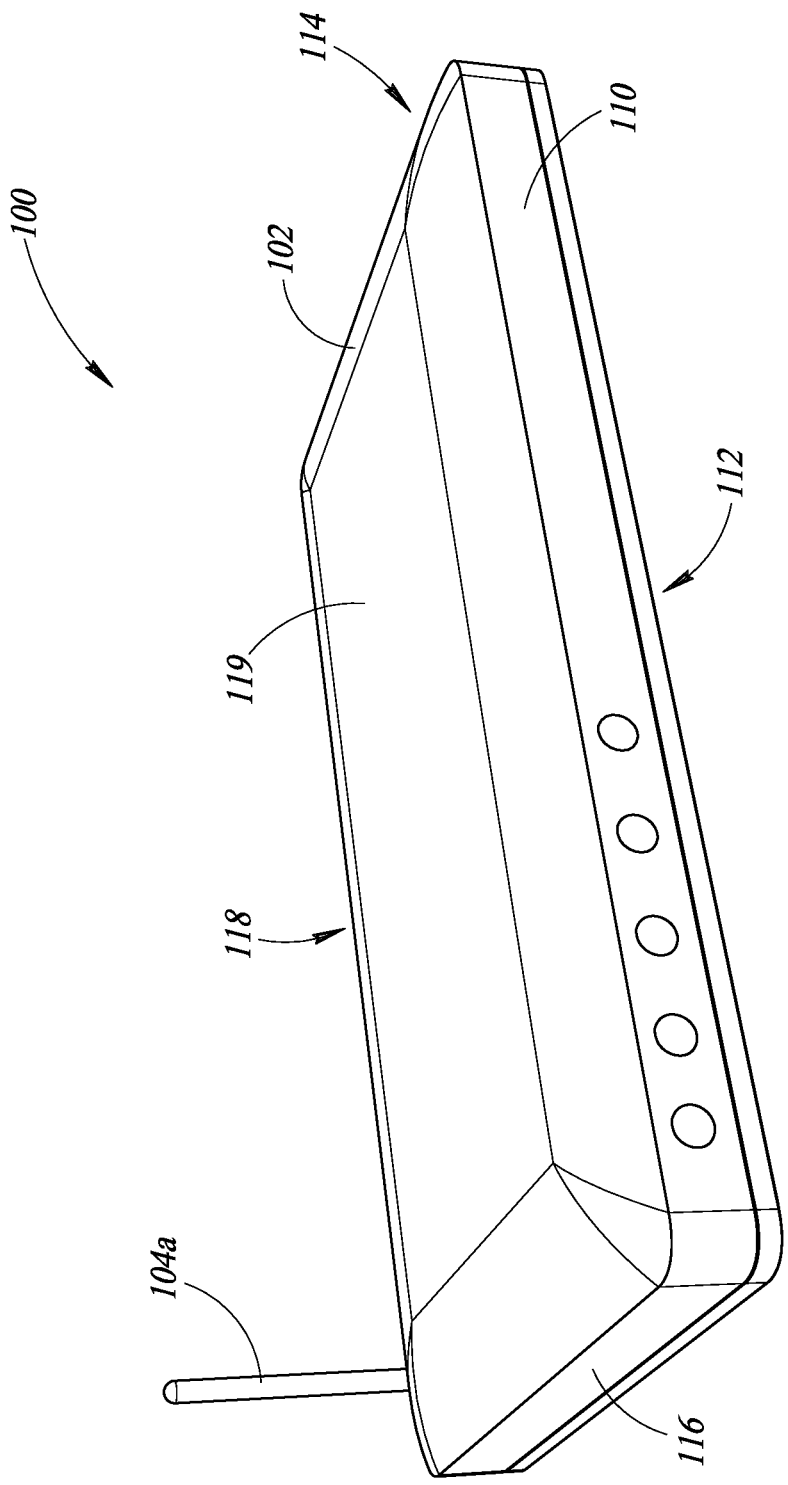
FIG. 1 is a front isometric view of a set-top box in a horizontal orientation according to one embodiment of the present disclosure.
Figure 2:
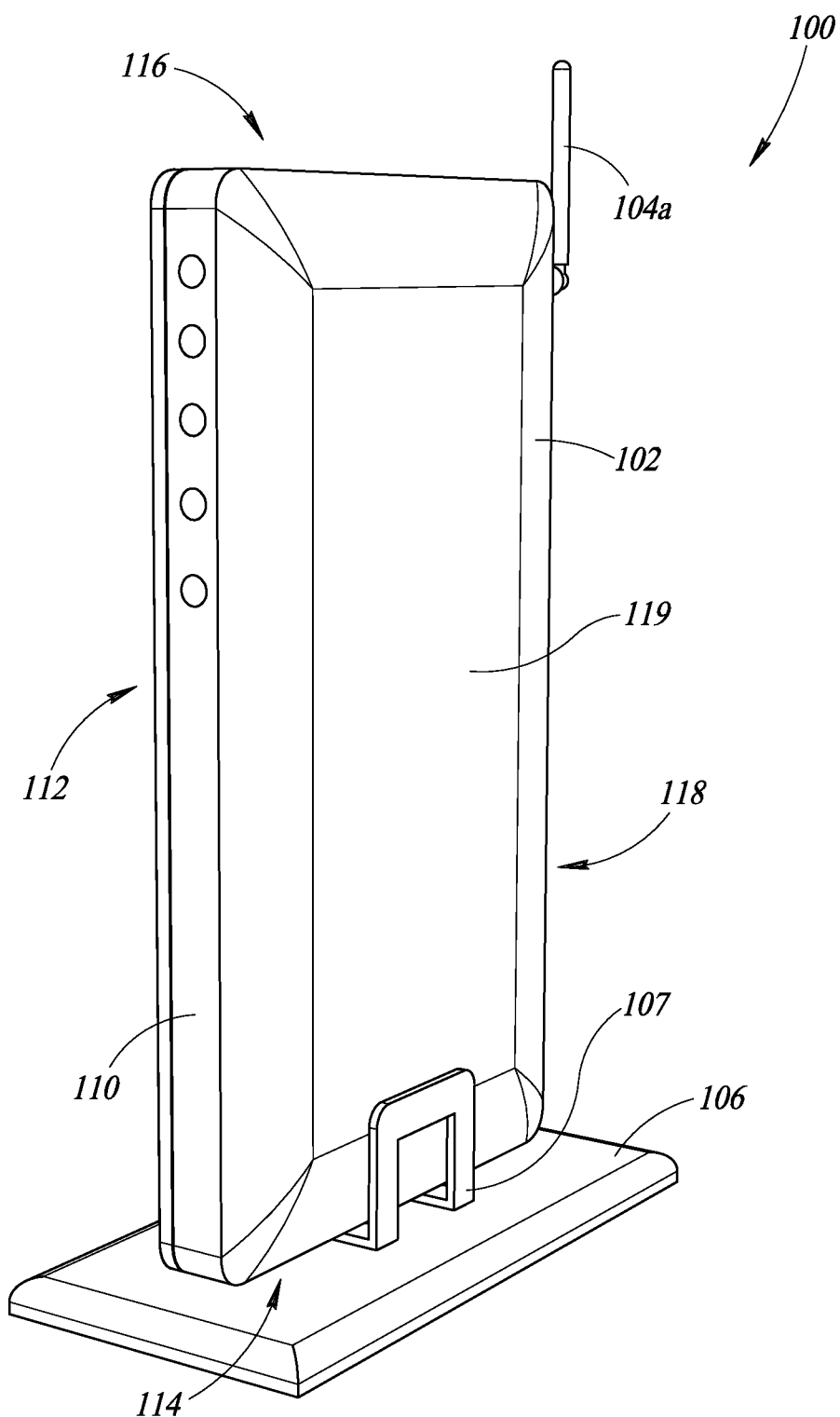
FIG. 2 is a front isometric view of a set-top box in a vertical orientation according to one embodiment of the present disclosure.

Referring now to FIGS. 1 and 2, a set-top box 100 is shown in two different orientations. In FIG. 1, the set-top box 100 is shown in a substantially horizontal orientation, while in FIG. 2, the set-top box 100 is shown in a substantially vertical orientation. The set-top box 100 may be oriented in a horizontal orientation as shown in FIG. 1, when placed, for example, on a shelf (see for example, shelf 402 in FIG. 4), in an entertainment center, fireplace mantel, or otherwise on horizontal surface. The set-top box 100 includes a housing 102 that has a top 119 and a bottom 112. The top 119 is connected to the bottom 112 by sidewalls, such as the front sidewall 110, the backside wall 118, the right side wall 114, and the left side wall 116.

Figure 3A:
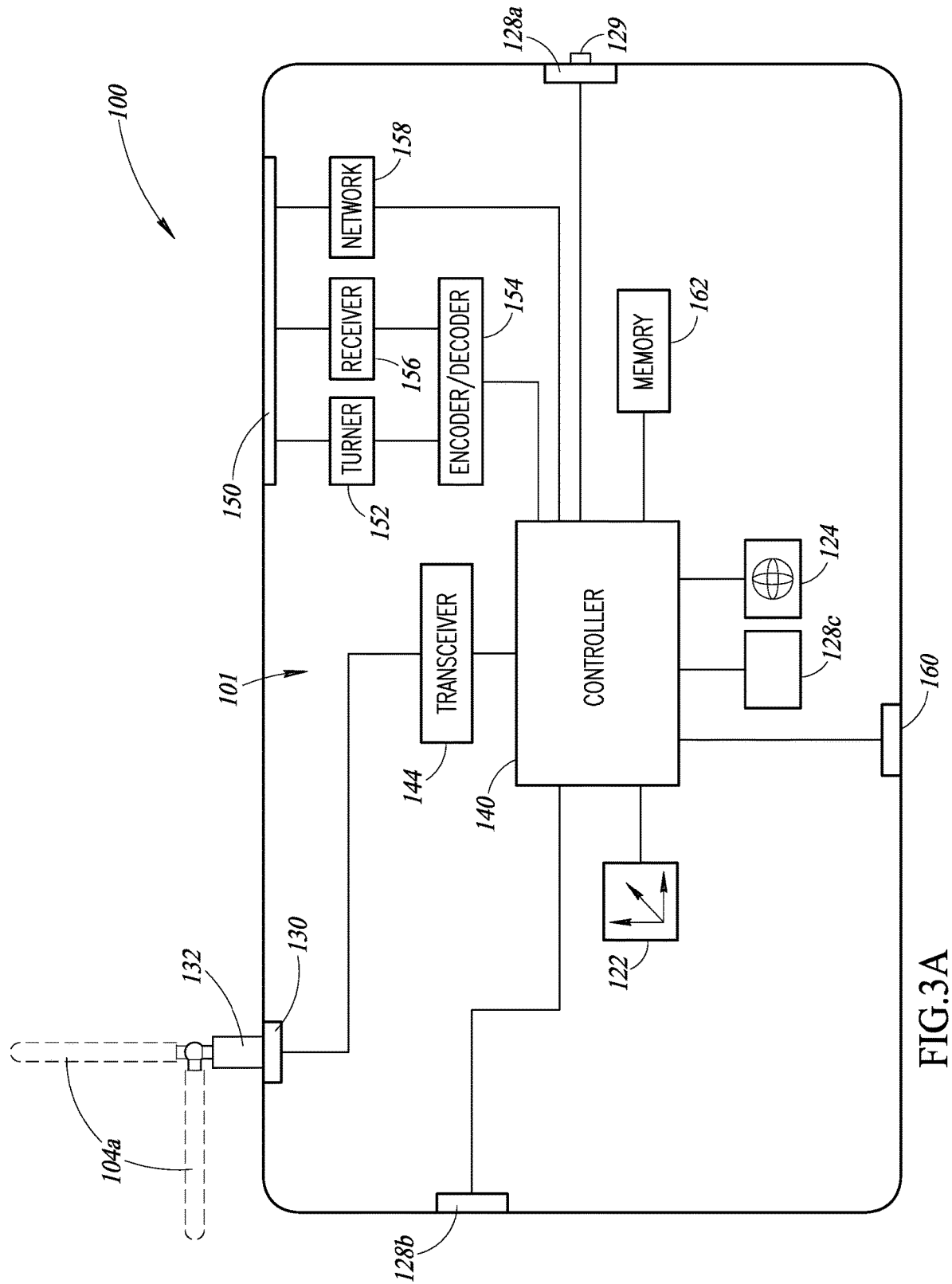
FIG. 3A is a diagram of the internal and external components of a set-top box according to one embodiment of the present disclosure.
Figure 3B:
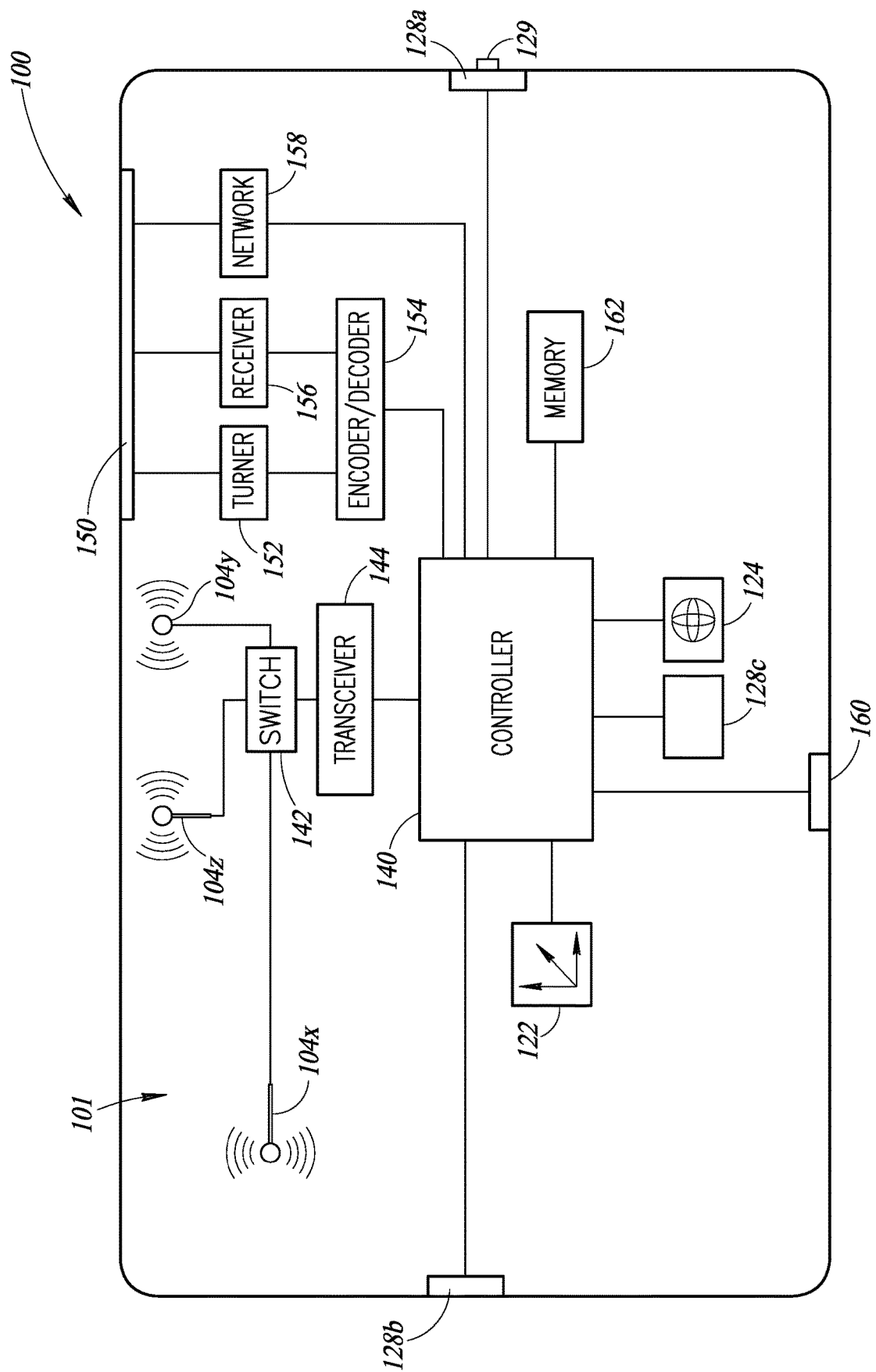
FIG. 3B is a diagram of the internal and external components of a set-top box according to one embodiment of the present disclosure.

As shown in FIGS. 3A and 3B, the housing 102 encloses an interior, wherein the components of the set-top box 100 are contained. The components may include audio and video encoding and decoding circuitry 154, a remote control interface 160, an audio/video receiver 156, network communication circuitry 158, and other components associated with receiving, decoding, transmitting, storing, and displaying audio and video signals. For example, the set-top box 100 includes a tuner 152 that may be a tuner for over-the-air signals, a cable card device for cable TV signals, a satellite tuner for satellite signals, or another type of tuner. The set-top box 100 also includes a memory 162. The memory may store commands and algorithms for the controller 140, or, if the set-top box 100 includes digital video recorder (DVR) capabilities, then the memory may store television, shows, other audio/video programming, and multimedia content. The set-top box 100 also includes one or more antennas 104 for transmitting and receiving information over a wireless communications network. The set-top box 100 transmits information, such as video/video recordings, multi-media files, and broadcast television shows, among other information, to various other devices that are connected to the wireless communications network. In some embodiments, the other devices include smart phones, tablets, smart televisions, streaming media players, or other set-top boxes, such as a wireless TV receiver.

The word antenna, as used herein, describes both a single antenna and a set or array of antennas. For example, as shown in FIGS. 1, 2, and 3A, a single external antenna is shown, but the set-top box 100, shown in FIGS. 1-3 may include several external antennas that work together to transmit signals on a wireless communication network. In addition, FIG. 3B shows the set-top box 100 with three internal antennas 104x, 104y, 104z. Each of the antennas 104x, 104y, 104z may be a single antenna oriented in a particular orientation or each may be a set of antennas in a particular orientation, each set being configured to work together to transmit information on a wireless communication network.

Multiple antennas also allow for different communication protocols and configurations. For example, multiple antennas may be hybridized to enable beam forming of the wireless signals emitted from the antennas 104a. In some embodiments, multiple antennas may be used in spatial streaming or in other transmission configurations.

The set-top box 100 includes an external antenna 104a connected to the internal components of the set-top box 100. As shown in FIG. 1, the antenna 104a is oriented in a vertical orientation extending perpendicular to the bottom 112 and top 119 of the set-top box 100. When in a vertical orientation, the antenna 104a is configured to radiate wireless communication signals in a substantially horizontal direction, in a radiation lobe that extends substantially parallel to the horizontal orientation of the set-top box 100. The horizontal radiation of wireless communication signals provides for increased signal range and robustness in household and commercial installations as compared to orienting the antenna horizontally for vertical radiation, because in such installations other devices that may receive the wireless communication signals are generally spread out substantially horizontally from each other rather than vertically.

The set-top box 100 may also be oriented in a vertical orientation as shown in FIG. 2. The set-top box 100 may be coupled to a base 106, which may also be a stand. In some embodiments, the base 106 may be integrally formed with the housing 102 of the set-top box 100, for example, the left side wall 116 or right side wall 114 may act as the base 106 when the set-top box 100 is in a vertical orientation.

In some embodiments, the base 106 may be retractably coupled to the set-top box 100. For example, such a retractably coupled base 106 may be positionable between a retracted position in which the set-top box is configured to lie in a horizontal orientation, and an extended position, wherein the base 106 supports the set-top box 100 in a vertical orientation.

In some embodiments, the base 106 may be detachably coupled to the set-top box 100. For example, the base 106 shown in FIG. 2 is detachably coupled to the set-top box 100 via holding arms 107 of the base 106. In some embodiments, the base may be coupled to the set-top box 100 via screws, pins, or other fasteners.

As shown in FIG. 2, the antenna 104a is oriented in a vertical orientation extending parallel to the bottom 112 and top 119 and perpendicular to the left side 116 and right side 114 of the housing 102 of the set-top box 100. When in a vertical orientation, the antenna 104a is configured to radiate wireless communication signals in a substantially horizontal direction, for example, in a plane substantially parallel to the horizontal orientation of the set-top box 100. If the antenna 104a were in the same orientation relative to the housing 102 when the housing 102 is in a vertical orientation as it is when the housing is in a horizontal orientation, then the radiation of the signals from the antenna would be compromised in one orientation versus the other.

If the antenna 104a were a manually positionable antenna, then a customer or user of the set-top box 100 would have to position the antenna and the proper orientation each time the set-top box 100 is moved from one orientation to another. To overcome this, in one embodiment as shown in FIG. 3A, the antenna 104a is a motorized antenna. The motorized antenna 104a includes a motor 132 that is configured to change the orientation of the antenna 104a. In the embodiment of FIG. 3A, the motor 132 is a servo motor or a stepper motor. In some embodiments, the motor 132 is a plurality of motors each configured to change the orientation of the antenna 104a. For example, a first motor may be configured to rotate the antenna while a second motor may be configured to tilt the antenna. The motorized antenna 104a also includes an antenna position sensor 130 that is configured to sense information related to the position of the antenna 104a. For example, the position sensor 130 may be an encoder such as a rotary encoder.

In the embodiment of FIGS. 3A and 3B, the set-top box 100 also includes one or more orientation sensors configured to aid in determining the orientation of the set-top box 100. For example, the set-top box 100 includes an accelerometer 122, a gyroscope 124, and proximity sensors 128. The accelerometer 122 measures the acceleration of the set-top box 100. In some embodiments, the accelerometer 122 is a three-axis accelerometer that measures acceleration in three orthogonal axes and coupled to the set-top box 100 in a known orientation.

The orientation of the set-top box 100 can be determined when the accelerometer is coupled to the set-top box 100 in a known orientation by measuring the direction of acceleration due to gravity relative to the set-top box 100. For example, if the accelerometer is oriented to measure acceleration in a direction perpendicular to the plane of the bottom 112 of the set-top box 100, then, if acceleration is measured in that direction, the set-top box 100 would be in a substantially horizontal orientation, for example as shown in FIG. 1. Similarly, with a three-axis accelerometer, wherein each axis is orthogonal to each other, the direction of acceleration due to gravity can measured and the orientation of the set-top box 100 can determined even when the set-top box 100 is in a disrupted orientation, for example, if the set-top box has fallen behind a shelf and is leaning, crookedly, against a wall.

The gyroscope 124 can also be used in determining the orientation of the set-top box 100. Similar to the accelerometer 122, if the gyroscope 124 is mounted or coupled to the set-top box 100 in a known orientation, then the gyroscope can provide information related to the orientation of the set-top box 100.

The proximity sensors 128 can also aid in determining the orientation of the set-top box 100. For example, the set-top box 100 includes a proximity sensor 128a. The proximity sensor 128a is a limit switch that changes state based on contact with an object, such as the stand 106. The proximity sensor 128a includes an actuator 129 linked to a set of contacts within the proximity sensor 128a such that when the base 106 is coupled to the right side 114 of the set-top box 100, the base presses against the actuator 129 and changes the state of the proximity sensor 128, for example, from a normally open position to a closed position.

The set-top box 100 also includes a proximity sensor 128b. The proximity sensor 128b is a photoelectric sensor that is configured to detect information related to the distance, absence, or presence of an object by using a light transmitter and a photoelectric receiver. A photoelectric sensor may transmit light of a known intensity and then that light is either received by the photoelectric sensor directly or light reflected off a nearby object may be received by the photoelectric receiver. The presence, absence, or distance to an object may be determined, in part, based on the presence or absence of light received by the photoelectric receiver and the intensity of light received by the photoelectric receiver. For example, if an object is near the proximity sensor 128b, the light reflected by the object into the photoelectric receiver may be relatively strong as compared to the light reflected by an object that is far from the proximity sensor 128b.

In some embodiments, one of the proximity sensors 128 may be configured to determine the state of a retractable base. For example, the proximity sensor may be in a first state when the stand is extended and in a second state when the stand is retracted.

In some embodiments, the set-top box 100 may include other proximity sensors and other locations. For example, the set-top box 100 includes a proximity sensor 128c located at the bottom 112 of the set-top box 100. The proximity sensor 128c is configured to sense information related to the proximity of an object such as a shelf or wall that is located near the bottom 112 of the set-top box 100.

The set-top box 100 includes a controller 140 that is electrically coupled to the motorized antenna 104a and the orientation sensors, such as the accelerometer 122, the gyroscope 124, and the proximity sensors 128. The controller 140 is configured to receive orientation information from the orientation sensors and use this information to determine the orientation of the set-top box 100 and then, based on the determined orientation of the set-top box 100, activate the motor 132 to move and reorient the antenna 104a. The antenna orientation sensor 130 may provide feedback to the controller 104 to aid in reorienting the antenna 104a.

In some embodiments, the set-top box 100 may determine that it is in a vertical orientation, for example as shown in FIG. 2, by receiving information from the proximity sensor 128a. In such an embodiment, when the base 106 is attached to the right side 114 of the set-top box 100, the base 106 contacts the actuator 129 of the proximity sensor 128, which may be a limit switch, causing the proximity sensor 128a to close a circuit which may be read by the controller 140. Upon reading the state of the proximity sensor 128a and determining that the base 106 is attached to the set-top box 100, the controller 140 may receive orientation information related to the orientation of the set-top box 100 from the orientation sensors and also receive antenna orientation information from the antenna orientation sensor 130. The controller 140 may use this information to actuate the antenna motor 132 to orientate the antenna 104a vertically such that the antenna 104a radiates wireless signals horizontally out from the set-top box 100.

External antennas may be susceptible to being knocked over, re-oriented, or broken by, for example, pets or children, without the user of the set-top box 100 knowing. In such a situation, the user may just be subjected to inferior data transmission rates as a result of the misoriented antenna. Therefore, as shown in FIG. 3B, the set-top box 100 may include multiple internal antennas 104x, 104y, and 104z. Each of the internal antennas 104x, 104y, 104z are located in different locations and in different orientations within an internal cavity 101 of the set-top box 100. For example, each of the internal antennas 104x, 104y, 104z are oriented in a direction that is orthogonal to each of the other internal antennas 104x, 104y, 104z. In particular, the internal antenna 104x is oriented in an orientation that is perpendicular to the left side wall 116, the internal antenna 104y is oriented in a direction that is perpendicular to the bottom 112 of the set-top box 100, and the internal antenna 104z is oriented in a direction that is perpendicular to the front surface 110 of the set-top box 100. In such an embodiment, with three orthogonal internal antennas 104x, 104y, 104z, at least one of the internal antennas 104x, 104y, 104z is oriented in a vertical direction, no matter which surface or side of the set-top box 100 it is set on. For example, when the set-top box 100 is oriented substantially horizontally as shown in FIG. 1, the antenna 104y is in a vertical orientation, while if the set-top box 100 is oriented vertically, for example, as shown in FIG. 2, then the antenna 104x is oriented vertically, and if the set-top box 100 is resting on either its front or back, then the antenna 104z is oriented vertically.

The set-top box 100, shown in FIG. 3B includes a controller 140 that is electrically coupled to the antennas 104x, 104y, 104z and the orientation sensors, such as the accelerometer 122, the gyroscope 124, and the proximity sensors 128. The controller 140 is configured to receive orientation information from the orientation sensors and use this information to determine the orientation of the set-top box 100 and then, based on the determined orientation of the set-top box 100, choose one of the antennas 104x, 104y, 104z for transmitting and receiving data. The controller 140 may select one of the antennas 104 by electrically coupling the antennas 104 to a transceiver 144 via a switch 142.

By way of example, the set-top box 100 may determine that it is in a vertical orientation, for example as shown in FIG. 2, by receiving information from the proximity sensor 128a. In such an embodiment, when the base 106 is attached to the right side 114 of the set-top box 100, the base 106 contacts the actuator 129 of the proximity sensor 128, which may be a limit switch, causing the proximity sensor 128a to close a circuit which may be read by the controller 140. Upon reading the state of the proximity sensor 128a and determining that the base 106 is attached to the set-top box 100, the controller 140 changes the state of the switch 142 such that the transceiver 144 is electrically coupled to the antenna 104x, which is oriented in a direction perpendicular to the plane of the right side 114 of the set-top box 100. Therefore, the antenna 104x would be oriented vertically and radiate wireless signals horizontally out from the set-top box 100.

In some embodiments, the controller 140 uses the proximity sensors to determine the presence or absence of nearby obstructions. Nearby objects such as a wall or a shelf may have a negative effect on the antennas 104 located within the set-top box 100 because antennas located very near objects or obstructions, such as a wall, may have reduced signal strength. Therefore, the set-top box 100 may include two different antennas 104z, a first antenna located near the bottom 112 and a second antenna that is located near the top 119 of the set-top box 100. In such an embodiment, should the set-top box 100 be mounted to a wall, the proximity sensor 128c, which is located at the bottom 112 of the set-top box 100, aids in detecting the presence of the wall. The controller 140, determining that the base 106 of the set-top box 100 is nearest the wall may then select the second antenna 104z that is located near the top of the set-top box 100 and furthest away from the wall.

The set-top box 100 also includes a wired communication system 150 coupled to the controller 100. The wired communication system 150 includes wired network communication capabilities via the network communication circuitry 158 and audio and video reception and transmission capabilities via the audio and video encoding and decoding circuitry 154, the audio/video receiver 156, and the tuner 152.

Figure 4:
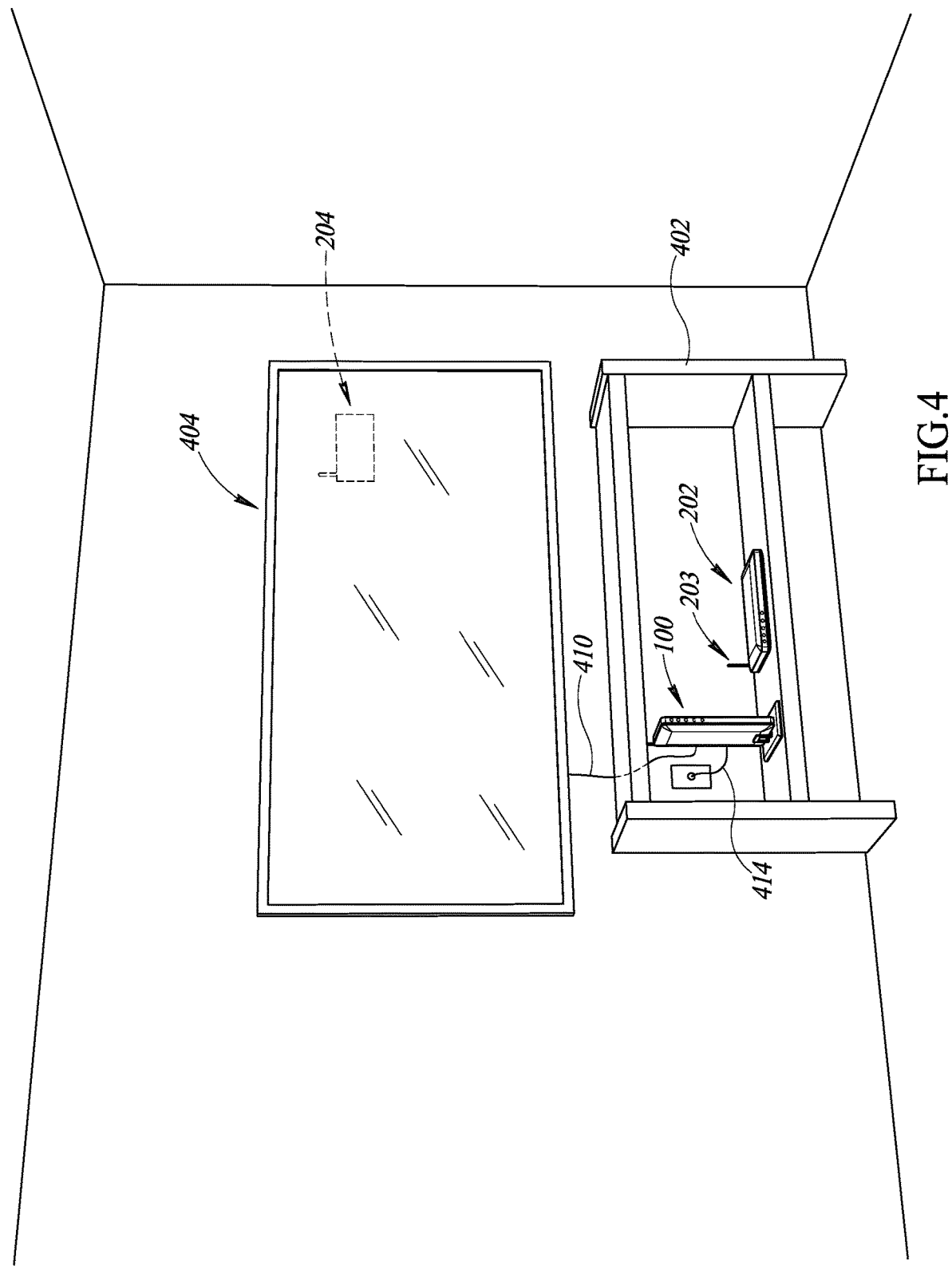
FIG. 4 is a diagram showing set-top boxes in multiple orientations according to one embodiment of the present disclosure.

As shown in FIG. 4 the wired communication system 150 may connect the set-top box 100 to a television 404 via an A/V cable 410. The wired communication system 150 may also connect the set-top box 100 to a satellite or cable communication system via a coaxial cable 414.

The orientation sensors can also be used in troubleshooting wireless communications problems with the set-top box 100 or between the set-top box 100 and other devices on a wireless communications network, for example, other set-top boxes 202, 204. For example, if the set-top box 100 is knocked over and is sitting in an unconventional orientation, none of the antennas 104 within the set-top box 100 may be oriented in a vertical orientation. In such a case, the controller 140 may determine that the set-top box 100 is in the unusual orientation, and then send an audio or video signal through the cable 410 to the television 404 to inform the user of the orientation problems with the set-top box 100 by displaying a message on the television 404.

The set-top box 100 may also communicate such orientation issues to a network or satellite system operator via the coaxial connection 414 to the cable network or satellite network. In such an embodiment, a customer service agent or system may receive the orientation information from the set-top box 100 and then inform the user of the problems and aid in re-orienting the set-top box 100 in a suitable orientation.

In some embodiments, the set-top box 100 communicates with one or more other set-top boxes, for example, set-top box 202 and set-top box 204. Usually the other set-top boxes 202 and 204 will be in different rooms from the transmitting set-top box 100, but that is not required. They are shown as being in the same room for ease of reference. In such an embodiment, the set-top box 100 may function as an access point and distribute A/V or other information to the other set-top boxes 202, 204. In some embodiments, the set-top box 100 may distribute the information using an air time fairness protocol in which the amount of time the set-top box 100 communicates to each of the other set-top boxes 202 is divided equally among the other set-top boxes 202, 204, during normal operation. In an embodiment wherein the orientation of one of the set-top boxes, for example, the set-top box 202, is disturbed, the orientation of the antenna 203 of the set-top box 202 may not be vertical and the rate at which the set-top box 100 is able to transmit data to the set-top box 202 may be significantly impaired. When this occurs, the set-top box 100 may notify the user of the orientation problems with the set-top box 202 and its antenna 203 by, for example, displaying a message on the television 404, or sending a message to the screen of another device that is connected to the wireless communications networks, such as a smart phone or tablet.

If, in addition to having data communication problems with the set-top box 202, the set-top box 204 is also demanding higher data rates than can be provided when splitting the air time between the set-top box 202 and the set-top box 204, then the setup box 100 may cut off communication with the external box 202 to free up additional air time to meet the communication demands of the set-top box 204.

The various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A portable electronic device, comprising:
a housing including an interior having a base and a top, and a first sidewall extending from a perimeter of the base to the top;
an antenna coupled to the housing;
one or more electric motors coupled to the antenna;
one or more orientation sensors coupled to the housing;
a controller coupled to the housing and electrically coupled to the antenna, the one or more electric motors, and the one or more orientation sensors,
the controller configured to receive information from the one or more orientation sensors, determine an orientation of the housing based on the information from the one or more orientation sensors, and actuate the one or more electric motors to change an orientation of the antenna based on the orientation of the housing; and
a transmitter within the housing selectively connectable to the antenna;
wherein, if the controller determines that the orientation of the housing is an orientation in which the base of the housing is oriented substantially horizontally, the controller is configured to actuate the one or more electric motors to change the orientation of the antenna to an orientation extending perpendicular to the base of the housing, and
wherein, if the controller determines that the orientation of the housing is an orientation in which the base of the housing is oriented substantially vertically, the controller is configured to actuate the one or more electric motors to change the orientation of the antenna to an orientation extending parallel to the base of the housing.

2. The portable electronic device of claim 1, wherein the controller is configured to actuate the one or more electric motors to change the orientation of the antenna such that the antenna radiates wireless signals horizontally out from the portable electronic device.

3. The portable electronic device of claim 1, wherein the one or more electric motors include a motor configured to rotate or tilt the antenna.

4. The portable electronic device of claim 1, wherein the one or more electric motors include a first motor configured to rotate the antenna and a second motor configured to tilt the antenna.

5. The portable electronic device of claim 1, wherein the one or more electric motors include a servo motor or a stepper motor.

6. The portable electronic device of claim 1, wherein the one or more electric motors are configured to rotate the antenna by ninety degrees to change the antenna between the orientation extending perpendicular to the base of the housing and the orientation extending parallel to the base of the housing.

7. The portable electronic device of claim 1, wherein a first of the one or more orientation sensors is a proximity sensor coupled to the housing and configured to sense if an object external to the housing is proximate the housing.

8. The portable electronic device of claim 1, wherein a first of the one or more orientation sensors is an accelerometer coupled to the housing configured to sense acceleration due to gravity on the housing.

9. The portable electronic device of claim 1, wherein a first of the one or more orientation sensors is a gyroscope coupled to the housing configured to sense an angular orientation of the housing.

10. A portable electronic device comprising:
a housing including an interior having a base and a top, and a first sidewall extending from a perimeter of the base to the top;
an antenna coupled to the housing;
one or more electric motors coupled to the antenna;
one or more orientation sensors coupled to the housing;
a controller coupled to the housing and electrically coupled to the antenna, the one or more electric motors, and the one or more orientation sensors,
the controller configured to receive information from the one or more orientation sensors, determine an orientation of the housing based on the information from the one or more orientation sensors, and actuate the one or more electric motors to change an orientation of the antenna based on the orientation of the housing;
a transmitter within the housing selectively connectable to the antenna; and
a position sensor coupled to the antenna and electrically coupled to the controller, the controller configured to receive information from the position sensor and determine the orientation of the antenna, and actuate the one or more electric motors to change the orientation of the antenna based on the orientation of the housing and the orientation of the antenna,
wherein the position sensor includes a rotary encoder.

11. The portable electronic device of claim 10,
wherein, if the controller determines that the orientation of the housing is an orientation in which a portion of the housing is oriented in a first direction, the controller is configured to actuate the one or more electric motors to change the orientation of the antenna to a first orientation, and
wherein, if the controller determines that the orientation of the housing is an orientation in which the portion of the housing is oriented in a second direction that is perpendicular to the first direction, the controller is configured to actuate the one or more electric motors to change the orientation of the antenna to a second orientation that is perpendicular to the first orientation.

12. The portable electronic device of claim 11, wherein the one or more electric motors are configured to rotate the antenna by ninety degrees to change the antenna between the first orientation and the second orientation.

13. A method of transmitting data on an antenna of a portable electronic device, the portable electronic device comprising a housing including an interior having a base and a top, a first sidewall extending from a perimeter of the base to the top, and a controller coupled to the housing and electrically coupled to the antenna, the method comprising:
receiving an indication of orientation of the housing of the portable electronic device from an orientation sensor, the housing having the antenna coupled thereto;
determining an orientation of the housing based on the indication of orientation the housing;
actuating an electrical motor to change an orientation of the antenna based on the orientation of the housing;
electrically connecting the antenna to a transmitter;
transmitting data from the transmitter on the antenna;
determining that the housing is oriented in a first direction;
in response to the determining that the housing is oriented in the first direction, changing the orientation of the antenna such that the antenna is oriented in a first orientation, and
determining that the housing is oriented in a second direction that is perpendicular to the first direction; and in response to the determining that the housing is oriented in the second direction, changing the orientation of the antenna such that the antenna is oriented in a second orientation that is perpendicular to the first orientation.

14. The method of claim 13, wherein the actuating changes the orientation of the antenna such that the antenna radiates wireless signals horizontally out from the housing.

15. The method of claim 13, wherein the actuating causes the antenna to rotate such that an orientation of the antenna changes by ninety degrees.

16. The method of claim 13, further comprising:
receiving an indication of orientation of the antenna; and
determining an orientation of the antenna based on the indication of orientation the antenna,
wherein the actuating is based on the orientation of the housing and the orientation of the antenna.

17. The method of claim 13, wherein the actuating includes:
actuating a first motor that rotates the antenna; and
actuating a second motor that tilts the antenna.

* * * * *